United States Patent
Araki (12)

(10) Patent No.: US 11,382,016 B2
(45) Date of Patent: Jul. 5, 2022

(54) COMMUNICATION SYSTEM, BASE STATION, AND CONTROL METHOD

(71) Applicant: NEC CORPORATION, Tokyo (JP)

(72) Inventor: Seiji Araki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 426 days.

(21) Appl. No.: 16/436,995

(22) Filed: Jun. 11, 2019

(65) Prior Publication Data

US 2019/0387447 A1  Dec. 19, 2019

(30) Foreign Application Priority Data

Jun. 15, 2018 (JP) .............................. JP2018-114339

(51) Int. Cl.
*H04W 36/00* (2009.01)
*H04W 24/10* (2009.01)
*H04W 36/30* (2009.01)
*H04W 36/20* (2009.01)

(52) U.S. Cl.
CPC ....... *H04W 36/30* (2013.01); *H04W 36/0077* (2013.01); *H04W 36/0094* (2013.01); *H04W 36/00835* (2018.08); *H04W 36/20* (2013.01)

(58) Field of Classification Search
None
See application file for complete search history.

(56) References Cited

U.S. PATENT DOCUMENTS

| 2010/0172329 | A1* | 7/2010 | Yokoyama | H04W 36/30 370/332 |
| 2012/0236806 | A1* | 9/2012 | Doppler | H04L 1/20 370/329 |
| 2015/0189540 | A1* | 7/2015 | Jung | H04L 47/2458 370/230 |
| 2017/0359752 | A1* | 12/2017 | Yousefi'zadeh | H04W 36/22 |
| 2019/0191351 | A1* | 6/2019 | Chong | H04B 17/327 |

FOREIGN PATENT DOCUMENTS

JP  11-313373 A  11/1999

* cited by examiner

*Primary Examiner* — Sai Aung

(57) ABSTRACT

Included are a mobile terminal 10, a server 40 that stores a communication quality indicator for each applicable service and for each cell, and a base station 20 that acquires, from the server 40, the communication quality indicator of a host cell that is the cell of the base station 20 for an applicable service used by the mobile terminal 10 camping on the host cell and the communication quality indicator of an adjacent cell adjacent to the host cell for the applicable service, and determines whether the host cell is an optimum cell for the applicable service among the host cell and the adjacent cell based on the communication quality indicators acquired by the communication unit, and when the host cell is not the optimum cell, make the mobile terminal 10 transition to the optimum cell.

9 Claims, 10 Drawing Sheets

| X | Y1 | Y2 | Y3 |
|---|---|---|---|
| 8% | 12% | 11% | 15% |

Fig. 9

| SINR | X | Y1 | Y2 | Y3 |
|---|---|---|---|---|
| −5〜−4 | 35% | 29% | 32% | 32% |
| −4〜−3 | 36% | 29% | 31% | 32% |
| −3〜−2 | 27% | 28% | 26% | 24% |
| −2〜−1 | 17% | 19% | 15% | 20% |
| −1〜0 | 12% | 13% | 14% | 16% |
| 0〜1 | 8% | 12% | 11% | 15% |
| 1〜2 | : | : | : | : |
| 2〜3 | : | : | : | : |
| 3〜4 | : | : | : | : |

Fig. 10

COMMUNICATION SYSTEM, BASE STATION, AND CONTROL METHOD

INCORPORATION BY REFERENCE

This application is based upon and claims the benefit of priority from Japanese patent application No. 2018-114339, filed on Jun. 15, 2018, the disclosure of which is incorporated herein in its entirety by reference.

TECHNICAL FIELD

The present disclosure relates to a communication system, a base station, and a control method.

BACKGROUND ART

Japanese Unexamined Patent Application Publication No. H11-313373 discloses a technique in which a mobile terminal announces communicable area information which is information about a communicable area corresponding to its position. It is considered that the technique described in Japanese Unexamined Patent Application Publication No. H11-313373 can contribute to making the mobile terminal transition to a communicable cell even when the mobile terminal camps on a non-communicable cell.

Incidentally, various services have been recently provided as applicable services which can be applied to mobile terminals. One of the applicable services is a Voice over Long Term Evolution (VoLTE) service which achieves high-quality voice calls.

In voice calls provided by the VoLTE service, audio dropout (a silent state of about 500 ms) occurs in areas with poor communication quality, and the occurrence of this audio dropout is one of the factors which degrade the user's sensible quality (the communication quality actually sensed by the user). The main factor causing the audio dropout is an occurrence of reconnection from the mobile terminal to a base station. If a voice call can be made in a cell where an occurrence frequency of reconnection is statically low, the user's sensible quality will be improved.

However, the technique described in Japanese Unexamined Patent Application Publication No. H11-313373 does not make a mobile terminal transition to an optimum cell according to the applicable service, and thus there is a problem that the mobile terminal may not receive the applicable service with preferred quality.

SUMMARY

Thus, an object of the present disclosure is to provide a communication system, a base station, and a control method which can solve the above-described problem and make a mobile terminal transition to an optimum cell according to an applicable service used by the mobile terminal.

A communication system according to an example aspect includes:
 a mobile terminal;
 a server configured to store a communication quality indicator for each applicable service and for each cell; and
 a base station configured to acquire, from the server, the communication quality indicator of a host cell that is the cell of the base station for an applicable service used by the mobile terminal camping on the host cell and the communication quality indicator of an adjacent cell adjacent to the host cell, determine whether the host cell is an optimum cell for the applicable service among the host cell and the adjacent cell based on the acquired communication quality indicators, and when the host cell is not the optimum cell, make the mobile terminal transition to the adjacent cell which is the optimum cell.

A base station according to an example aspect includes:
 a communication unit configured to acquire, from the server, a communication quality indicator of a host cell that is the cell of the base station for an applicable service used by a mobile terminal camping on the host cell and the communication quality indicator of an adjacent cell adjacent to the host cell; and
 a processing unit configured to determine whether the host cell is an optimum cell for the applicable service among the host cell and the adjacent cell based on the communication quality indicators acquired by the communication unit, and when the host cell is not the optimum cell, make the mobile terminal transition to the optimum cell.

A server according to an example aspect includes:
 a storage unit configured to store a communication quality indicator for each applicable service and for each cell; and
 a communication unit configured to transmit, to a base station, the communication quality indicator of a cell for an applicable service used by a mobile terminal camping on the cell of the base station and the communication quality indicator of an adjacent cell adjacent to the cell.

A method for controlling a base station according to an example aspect includes:
 acquiring, from a server, a communication quality indicator of a host cell that is the cell of the base station for an applicable service used by a mobile terminal camping on the host cell and a communication quality indicator of an adjacent cell adjacent to the host cell;
 determining whether the host cell is an optimum cell for the applicable service among the host cell and the adjacent cell based on the acquired communication quality indicators, and when the host cell is not the optimum cell, making the mobile terminal transition to the adjacent cell which is the optimum cell.

A method for controlling a server according to an example aspect includes:
 storing a communication quality indicator for each applicable service and for each cell; and
 transmitting, to a base station, the communication quality indicator of a cell for an applicable service used by a mobile terminal camping on the cell of the base station and the communication quality indicator of an adjacent cell adjacent to the cell.

A non-transitory computer readable medium according to an example aspect stores a program causing a base station to execute:
 a step of acquiring, from a server, a communication quality indicator of a host cell that is the cell of the base station for an applicable service used by a mobile terminal camping on the host cell and a communication quality indicator of an adjacent cell adjacent to the host cell;
 a step of determining whether the host cell is an optimum cell for the applicable service among the host cell and the adjacent cell based on the acquired communication quality indicators, and when the host cell is not the optimum cell, making the mobile terminal transition to the adjacent cell which is the optimum cell.

A non-transitory computer readable medium according to an example aspect stores a program causing a server to execute:
 a step of storing a communication quality indicator for each applicable service and for each cell; and a step of transmitting, to a base station, the communication quality indicator of a cell for an applicable service used by a mobile terminal camping on the cell of the base station and the communication quality indicator of an adjacent cell adjacent to the cell.

According to the above example aspects, it is possible to achieve the communication system, the base station, and the control method which can make the mobile terminal transition to the optimum cell according to the applicable service used by the mobile terminal.

BRIEF DESCRIPTION OF DRAWINGS

The above and other aspects, features and advantages of the present disclosure will become more apparent from the following description of certain exemplary embodiments when taken in conjunction with the accompanying drawings, in which:

FIG. 9 is a diagram showing an example of communication quality indicator data of each cell for a certain applicable service stored in a data storage unit of the station data server in the communication system according to the first embodiment;

FIG. 10 is a diagram showing an example of communication quality indicator data of each cell for a certain applicable service and for each SINR stored in the data storage unit of the station data server in the communication system according to a second embodiment;

EMBODIMENTS

Hereinafter, embodiments of the present disclosure will be described with reference to the drawings. The following descriptions and drawings are omitted and simplified as appropriate for clear descriptions. Further, in the following drawings, the same elements are denoted by the same signs, and repeated descriptions are omitted as necessary.

(1) First Embodiment (1-1) Configuration of First Embodiment

Figure 1:
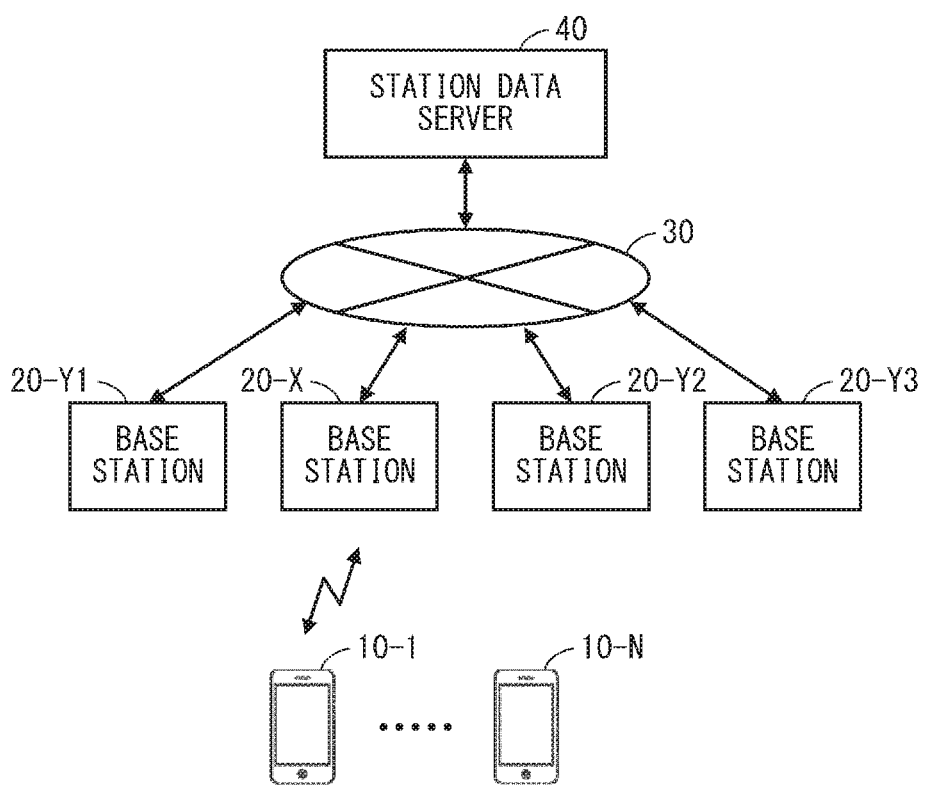
FIG. 1 is a diagram showing a configuration example of a communication system according to a first embodiment.

First, a configuration of a communication system according to the first embodiment will be described with reference to FIG. 1. FIG. 1 is a diagram showing a configuration example of the communication system according to the first embodiment.

As shown in FIG. 1, the communication system according to the first embodiment includes N (N is a natural number of two or more) mobile terminals 10-1 to 10-N (hereinafter, when a reference is made to the mobile terminals 10-1 to 10-N collectively, they will be referred to simply as the "mobile terminal 10" as appropriate), four base stations 20-X and 20-Y1 to 20-Y3 (hereinafter, when a reference is made to the base stations 20-X and 20-Y1 to 20-Y3 collectively, they will be referred to simply as the "base station 20" as appropriate), and a station data server 40. Although the number of the base stations 20 is four in FIG. 1, this is an example, and the number of base stations 20 may be two or more. Further, although the number of mobile terminals 10 is plural, this is an example, and the number of mobile terminals 10 may be one.

The mobile terminal 10 can be connected to the base station 20 and communicate with the base station 20. The base station 20 and the station data server 40 are connected to each other via the Internet 30. In the first embodiment, a cell of the base station 20-X is adjacent to three cells of base stations 20-Y1 to 20-Y3, respectively. That is, adjacent cells which are adjacent to the cell of the base station 20-X are three cells of the base stations 20-Y1 to 20-Y3.

Figure 2:
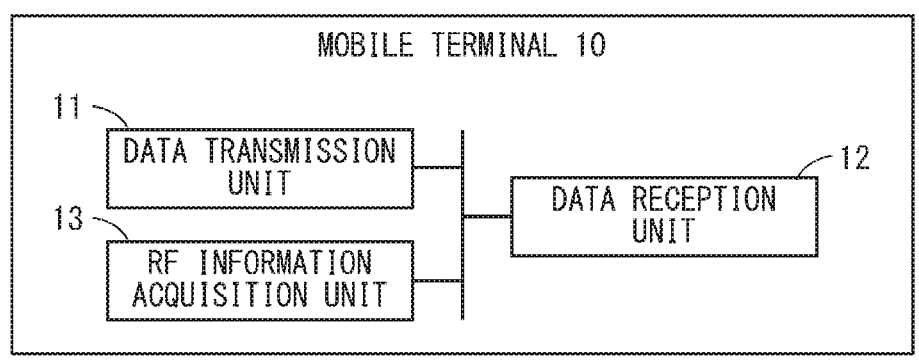
FIG. 2 is a block diagram showing a configuration example of a mobile terminal according to the first embodiment.

Next, a configuration of the mobile terminal 10 will be described with reference to FIG. 2. FIG. 2 is a block diagram showing a configuration example of the mobile terminal 10.

As shown in FIG. 2, the mobile terminal 10 includes a data transmission unit 11, a data reception unit 12, and an RF (Radio Frequency) information acquisition unit 13.

The data transmission unit 11 transmits data to the base station 20. The data reception unit 12 receives data from the base station 20.

The RF information acquisition unit 13 acquires RF information. The RF information is, for example, a cell number of a camping cell on which the mobile terminal 10 camps and a cell number of an adjacent cell adjacent to the camping cell. The RF information acquired by the RF information acquisition unit 13 is transmitted by the data transmission unit 11 to the base station 20 of the camping cell.

Figure 3:
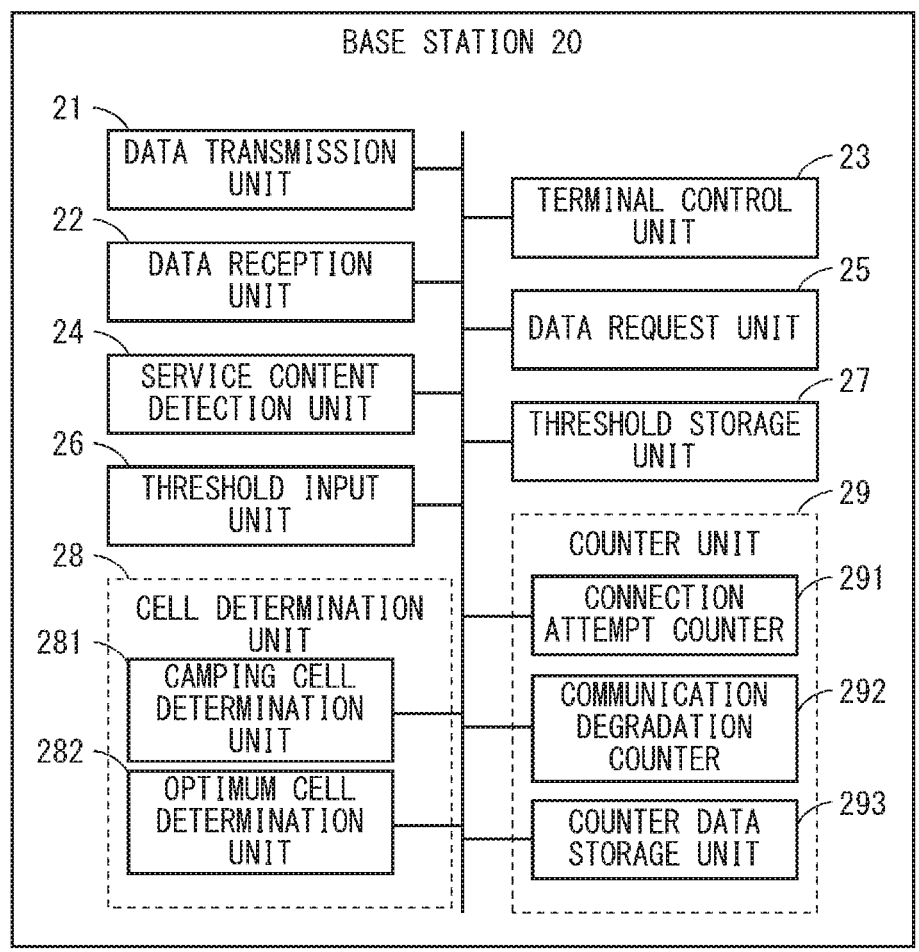
FIG. 3 is a block diagram showing a configuration example of a base station according to the first embodiment.

Next, a configuration of the base station 20 will be described with reference to FIG. 3. FIG. 3 is a block diagram showing a configuration example of the base station 20.

As shown in FIG. 3, the base station 20 includes a data transmission unit 21, a data reception unit 22, a terminal control unit 23, a service content detection unit 24, a data request unit 25, a threshold input unit 26, a threshold storage unit 27, a cell determination unit 28, and a counter unit 29.

The data transmission unit 21 transmits data to the mobile terminal 10 and the station data server 40. The data reception unit 22 receives data from the mobile terminal 10 and the station data server 40.

The terminal control unit 23 controls cell transition of the mobile terminal 10 camping on the cell (the cell of the base station 20, hereinafter referred to as a host cell).

The service content detection unit 24 detects which applicable service the mobile terminal 10 camping on the host cell is using from among the applicable services applicable to the mobile terminal 10. In the first embodiment, the applicable service applicable to the mobile terminal 10 includes at least a VoLTE service. Other applicable services are optional, but can include, for example, an FTP (File Transfer Protocol) service that transmits and receives data using FTP.

The data request unit 25 requests the mobile terminal 10 camping on the host cell for the RF information. Further, the data request unit 25 requests the station data server 40 for a communication quality indicator of the host cell for the applicable service used by the mobile terminal 10 camping on the host cell and a communication quality indicator of an adjacent cell adjacent to the host cell (i.e., the camping cell having the cell number acquired from the mobile terminal 10 as the RF information and the adjacent cell). The communication quality indicator shows the probability that the quality of user's sensible quality degrades and is expressed as a percentage. Thus, the lower the value of the communication quality indicator, the lower the probability that the user's sensible quality degrades, meaning that the communication quality is higher.

A threshold of the communication quality indicator for each applicable service is input to the threshold input unit 26. The threshold storage unit 27 stores the threshold of the communication quality indicator for each applicable service input to the threshold input unit 26.

The cell determination unit 28 includes a camping cell determination unit 281 and an optimum cell determination unit 282.

The camping cell determination unit 281 determines whether the communication quality indicator of the host cell (i.e., the camping cell) exceeds the threshold regarding the applicable service used by the mobile terminal 10 camping on the host cell.

When the determination result made by the camping cell determination unit 281 indicates that the communication quality indicator exceeds the threshold, the optimum cell determination unit 282 determines the cell with the highest communication quality (i.e., the cell with the smallest communication quality indicator) among the host cell (i.e., the camping cell) and the adjacent cell adjacent to the host cell regarding the applicable service used by the mobile terminal 10 camping on the host cell. When the determination result made by the optimum cell determination unit 282 indicates that the cell with the highest communication quality is the adjacent cell, the terminal control unit 23 makes the mobile terminal 10 transition to the adjacent cell.

The counter unit 29 includes a connection attempt counter 291, a communication degradation counter 292, and a counter data storage unit 293.

The connection attempt counter 291 counts the number of connection attempts, which is the number of times the mobile terminal 10 camping on the host cell and using the applicable service has attempted to connect to the host base station 20 for each applicable service.

The communication degradation counter 292 counts the number of times of communication degradation, which is the number of times the communication quality of the mobile terminal 10 camping on the host cell and using the applicable service has degraded for each applicable service. The communication quality here refers to communication quality other than the number of connection attempts, and is, for example, a signal to interference ratio (SINR), a reception level, a bit error rate (BER), etc. Further, the number of times the communication quality has degraded is, for example, the number of times the communication quality has become equal to or less than the threshold.

The counter data storage unit 293 stores connection attempt counter data indicating the number of connection attempts for each applicable service counted by the connection attempt counter 291 and communication degradation counter data indicating the number of times of the communication degradation for each applicable service counted by the communication degradation counter 292. The connection attempt counter data and communication degradation counter data for each applicable service stored in the counter data storage unit 293 are transmitted by the data transmission unit 21 to the station data server 40, for example, at 0 o'clock. After the transmission to the station data server 40, the connection attempt counter data of the connection attempt counter 291 and the communication degradation counter data of the communication degradation counter 292 are reset.

Figure 4:
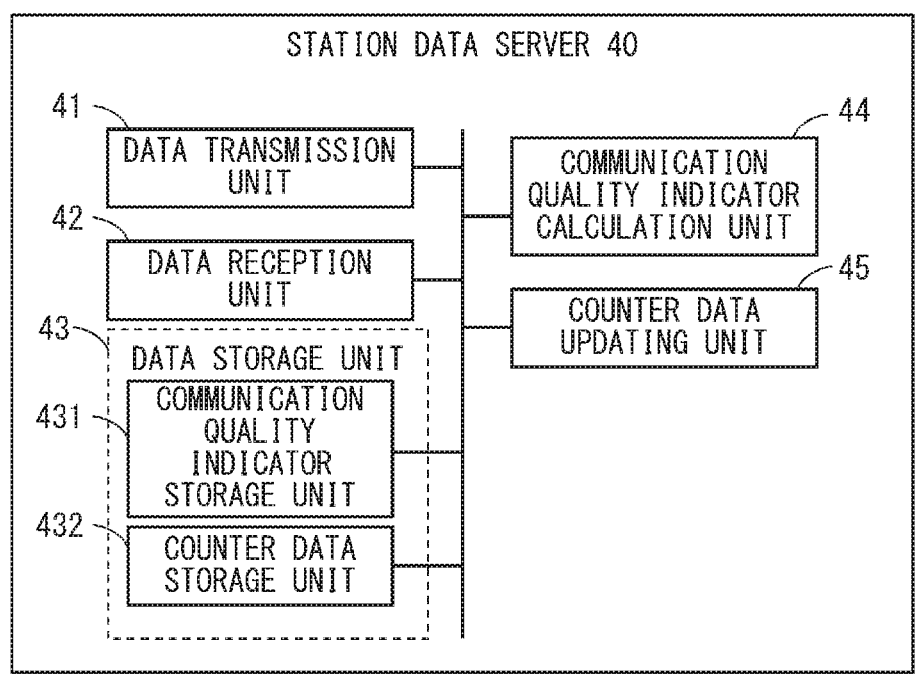
FIG. 4 is a block diagram showing a configuration example of a station data server according to the first embodiment.

Next, a configuration of the station data server 40 will be described with reference to FIG. 4. FIG. 4 is a block diagram showing a configuration example of the station data server 40.

As shown in FIG. 4, the station data server 40 includes a data transmission unit 41, a data reception unit 42, a data storage unit 43, a communication quality indicator calculation unit 44, and a counter data updating unit 45.

The data transmission unit 41 transmits data to the base station 20. The data reception unit 42 receives data from the base station 20.

The data storage unit 43 includes a communication quality indicator storage unit 431 and a counter data storage unit 432.

The communication quality indicator storage unit 431 stores the communication quality indicator for each applicable service and for each cell. The communication quality indicator stored in the communication quality indicator storage unit 431 is transmitted by the data transmission unit 41 to the base station 20 in response to a request from the base station 20.

The counter data storage unit 432 stores the connection attempt counter data and the communication degradation number counter data transmitted from the base station 20 for each applicable service and for each cell. The connection attempt counter data and the communication degradation counter data are stored, for example, for 30 days.

The communication quality indicator calculation unit 44 calculates the communication quality indicator for each applicable service and for each cell, for example, based on the total number of pieces of the connection attempt counter data for 30 days and the total number of pieces of the communication degradation counter data. The communication quality indicator for each applicable service and for each cell calculated by the communication quality indicator calculation unit 44 is stored in the communication quality indicator storage unit 431.

When the counter data updating unit 45 receives the connection attempt counter data and the communication degradation counter data for each applicable service from the base station 20, it updates the connection attempt counter data and the communication degradation counter data for each applicable service and for each cell stored in the counter data storage unit 432.

(1-2) Operation of First Embodiment

Next, an operation of the communication system according to the first embodiment will be described.

Figure 5:
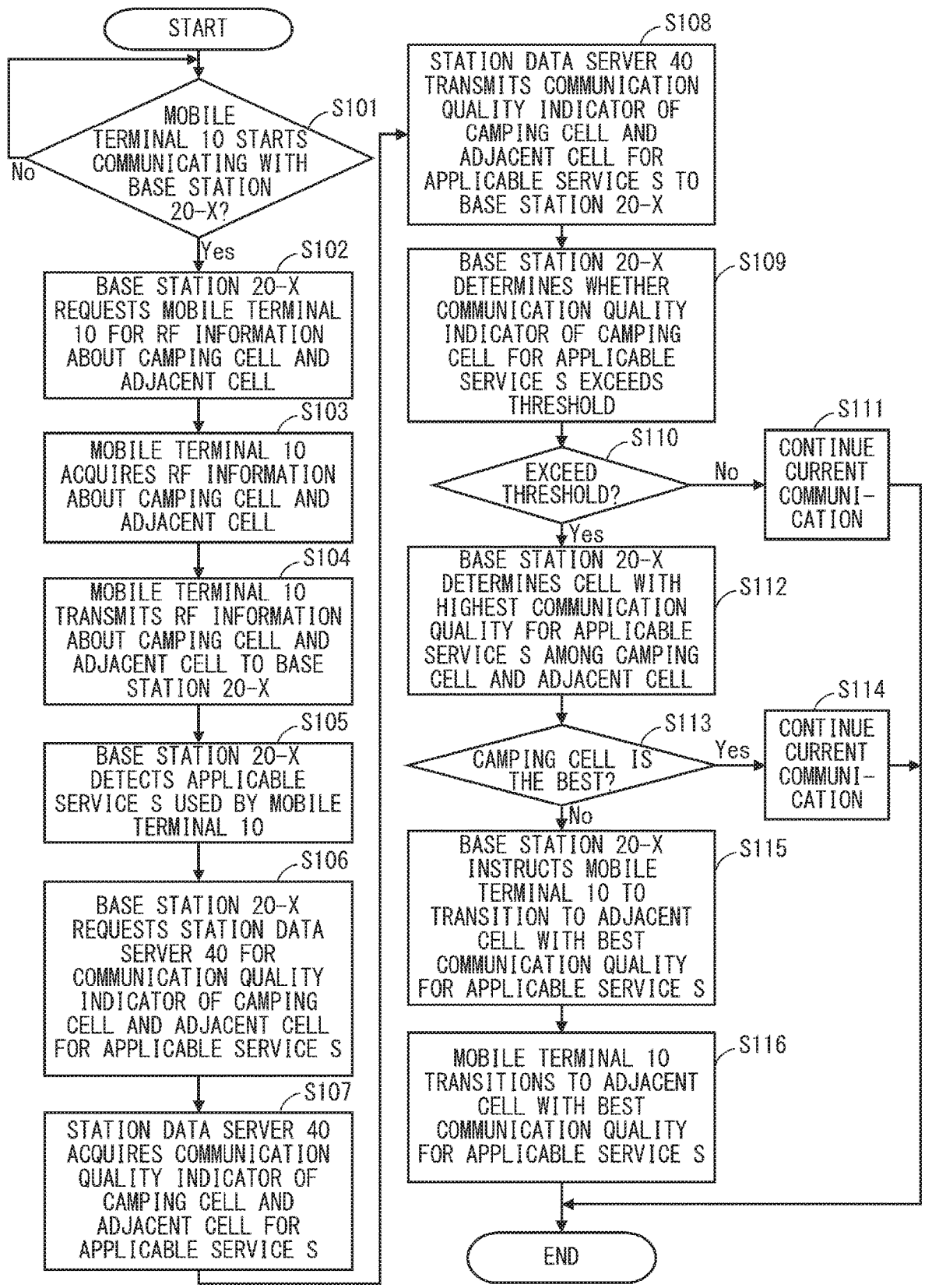
FIG. 5 is a flowchart showing an operation example when a base station controls cell transition according to an applicable service used by a mobile terminal in a communication system according to the first embodiment.

First, an operation when the base station 20 controls cell transition according to the applicable service used by the mobile terminal 10 will be described with reference to FIG. 5. FIG. 5 is a flowchart showing an operation example when the base station 20 controls cell transition according to the applicable service used by the mobile terminal 10 in the communication system according to the first embodiment. FIG. 5 shows an operation example when the base station 20-X communicates with the mobile terminal 10.

As shown in FIG. 5, in the base station 20-X, when the mobile terminal 10 camping on the cell of the base station 20-X is connected to the base station 20-X and starts communication (Step S101: Yes), the data request unit 25 requests the mobile terminal 10 for the RF information about the cell on which the mobile terminal 10 camps and the adjacent cell (Step S102). The request for the RF information is transmitted from the data transmission unit 21 of the base station 20-X.

In the mobile terminal 10, after the data reception unit 12 receives the request for the RF information from the base station 20-X, the RF information acquisition unit 13 acquires the RF information about the camping cell (i.e., the cell of the base station 20-X) and the adjacent cells (i.e., the cells of the base stations 20-Y1, 20-Y2, and 20-Y3) (Step S103). At this time, cell numbers are acquired as the RF information. Hereinafter, suppose that the cell of the base station 20-X has a cell number of X and is referred to as a camping cell X or a cell X. The cells of the base stations 20-Y1, 20-Y2, and 20-Y3 are assumed to have the cell numbers Y1, Y2, and Y3 and are referred to as adjacent cells Y1, Y2, and Y3 or cells Y1, Y2, and Y3, respectively.

In the mobile terminal 10, after the RF information acquisition unit 13 acquires the RF information about the camping cell and the adjacent cells, the data transmission unit 11 transmits the RF information about the camping cell and the adjacent cells to the base station 20-X (Step S104). At this time, in the base station 20-X, the data reception unit 22 receives the RF information.

Next, in the base station 20-X, the service content detection unit 24 detects the applicable service used by the mobile terminal 10 (Step S105). Here, suppose that the applicable service used by the mobile terminal 10 is an applicable service S that is a VoLTE service.

In the base station 20-X, after the service content detection unit 24 detects the applicable service S, the data request unit 25 requests the station data server 40 for the communication quality indicator of the camping cell X for the applicable service S, and for the communication quality indicators of the adjacent cells Y1, Y2, and Y3 for the applicable service S (Step S106). The request for the communication quality indicator is transmitted from the data transmission unit 21 of the base station 20-X.

In the station data server 40, after the data reception unit 42 receives the request for the communication quality indicator from the base station 20-X, the data transmission unit 41 acquires the communication quality indicator of the camping cell X for the applicable service S, and the communication quality indicators of the adjacent cells Y1, Y2, and Y3 for the applicable service S, stored in the communication quality indicator storage unit 431 (Step S107).

Here, suppose that the communication quality indicator of the camping cell X for the applicable service S is $S_X$, and the communication quality indicators of the adjacent cells Y1, Y2, and Y3 for the applicable service S are $S_{Y1}$, $S_{Y2}$, and $S_{Y3}$, respectively.

In the station data server 40, after the data transmission unit 41 acquires the communication quality indicator of the cell X for the applicable service S, and the communication quality indicators of the adjacent cells Y1, Y2, and Y3 for the applicable service S, it transmits, to the base station 20-X, the communication quality indicator of the camping cell X for the applicable service S, and the communication quality indicators of the adjacent cells Y1, Y2, and Y3 for the applicable service S (Step S108). At this time, in the base station 20-X, the data reception unit 22 receives the communication quality indicator of the camping cell X for the applicable service S and the communication quality indicators of the adjacent cells Y1, Y2, and Y3 for the applicable service S.

Next, in the base station 20-X, the camping cell determination unit 281 determines whether the communication quality indicator $S_X$ of the camping cell X for the applicable service S is exceeding the threshold (which is $S_A$) of the communication quality indicator of the applicable service S stored in the threshold storage unit 27 (i.e., whether $S_X > S_A$ holds) (Step S109).

When $S_X$ does not exceed $S_A$, that is, if $S_X \leq S_A$ holds (No in Step S110), the camping cell X meets the communication quality standard of the applicable service S. Thus, in the base station 20-X, the terminal control unit 23 continues the current communication between the mobile terminal 10 and the base station 20-X of the camping cell X (Step S111).

On the other hand, when $S_X$ exceeds $S_A$, that is, if $S_X > S_A$ holds (Yes in Step S110), the camping cell X does not meet the communication quality standard of the applicable service S. Thus, in the base station 20-X, the optimum cell determination unit 282 determines the cell with the highest communication quality for the applicable service S among the camping cell X and the adjacent cells Y1, Y2, and Y3 (Step S112). The communication quality indicator with the highest communication quality for the applicable service S is represented by the minimum value $S_M = \mathrm{Min}\{S_X, S_{Y1}, S_{Y2}, S_{Y3}\}$ of $S_X$, $S_{Y1}$, $S_{Y2}$, $S_{Y3}$. Therefore, the cell with the highest communication quality for the applicable service S is a cell M whose communication quality indicator is $S_M$. For example, when $S_M = S_{Y1}$, the cell with the highest communication quality for the applicable service S is the cell M=the cell Y1.

In the base station 20-X, after the optimum cell determination unit 282 determines the cell M with the highest communication quality for the applicable service S, the terminal control unit 23 determines whether the cell M with the highest communication quality for the applicable service S is the camping cell X (i.e., whether M=X) (Step S112).

When the cell M with the highest communication quality for the applicable service S is the camping cell X, namely, when M=X (Yes in Step S113), the terminal control unit 23 continues the current communication between the mobile terminal 10 and the base station 20-X (Step S114).

On the other hand, when the cell M with the highest communication quality for the applicable service S is not the camping cell X, namely, M=Y1, Y2, Y3 (No in Step S113), the terminal control unit 23 instructs the mobile terminal 10 to transition to the cell M (i.e., any one of the adjacent cells Y1, Y2 and Y3) (Step S115).

After that, the mobile terminal 10 transitions to the cell M indicated by the base station 20-X (Step S116). For example, consider a case when the cell Y1 of the base station 20-Y1 is the cell M, and the mobile terminal 10 transitions from the cell X to the cell Y1. In this case, the base station 20-X releases the connection with the mobile terminal 10, and issues a redirection instruction to the mobile terminal 10 to transition to the cell Y1 of the base station 20-Y1. In the mobile terminal 10, the data transmission unit 11 and the data reception unit 12 perform a redirection procedure with the data transmission unit 21 and the data reception unit 22 of the base station 20-Y1. Upon completion of the redirection procedure, the mobile terminal 10 can continue to receive the applicable service S by the base station 20-Y1 with better user's sensible quality than that of the base station 20-X.

The base station 20-X performs the operation of FIG. 5 each time communication with the mobile terminal 10 is started.

The other base stations 20-Y1, 20-Y2 and 20-Y3 also perform the operation of FIG. 5 each time communication with the mobile terminal 10 is started in a manner similar to the base station 20-X.

Figure 6:
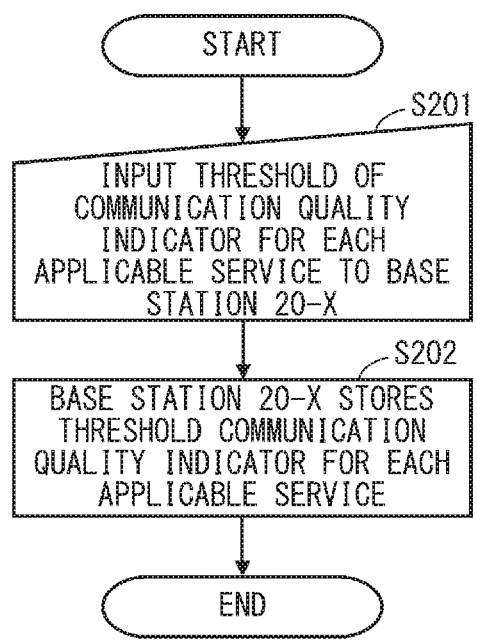
FIG. 6 is a flowchart showing an operation example when a threshold of a communication quality indicator for each applicable service is input to the base station in the communication system according to the first embodiment.

Next, the operation of inputting the threshold of the communication quality indicator for each applicable service to the base station 20 will be described with reference to FIG. 6. FIG. 6 is a flowchart showing an operation example when the threshold of the communication quality indicator for each applicable service is input to the base station 20 in the communication system according to the first embodiment. FIG. 6 shows an operation example when the threshold is input to the base station 20-X.

As shown in FIG. 6, the user inputs, to the threshold input unit 26 of the base station 20-X, the threshold of the communication quality indicator for each applicable service when the mobile terminal 10 camps on the cell X of the base station 20-X (Step S201).

In the base station 20-X, the threshold storage unit 27 stores the threshold of the communication quality indicator for each applicable service input to the threshold input unit 26 by the user (Step S202).

The other base stations 20-Y1, 20-Y2, and 20-Y3 perform the operation of FIG. 6 in a manner similar to the base station 20-X.

In Step S201, the user may collectively input the thresholds of all the applicable services or may input the thresholds of all the applicable services in a divided manner, specifically, may input the thresholds of the communication quality indicators for only some applicable services each time. In this case, in Step S202, the threshold input in Step S201 may be stored.

Figure 7:
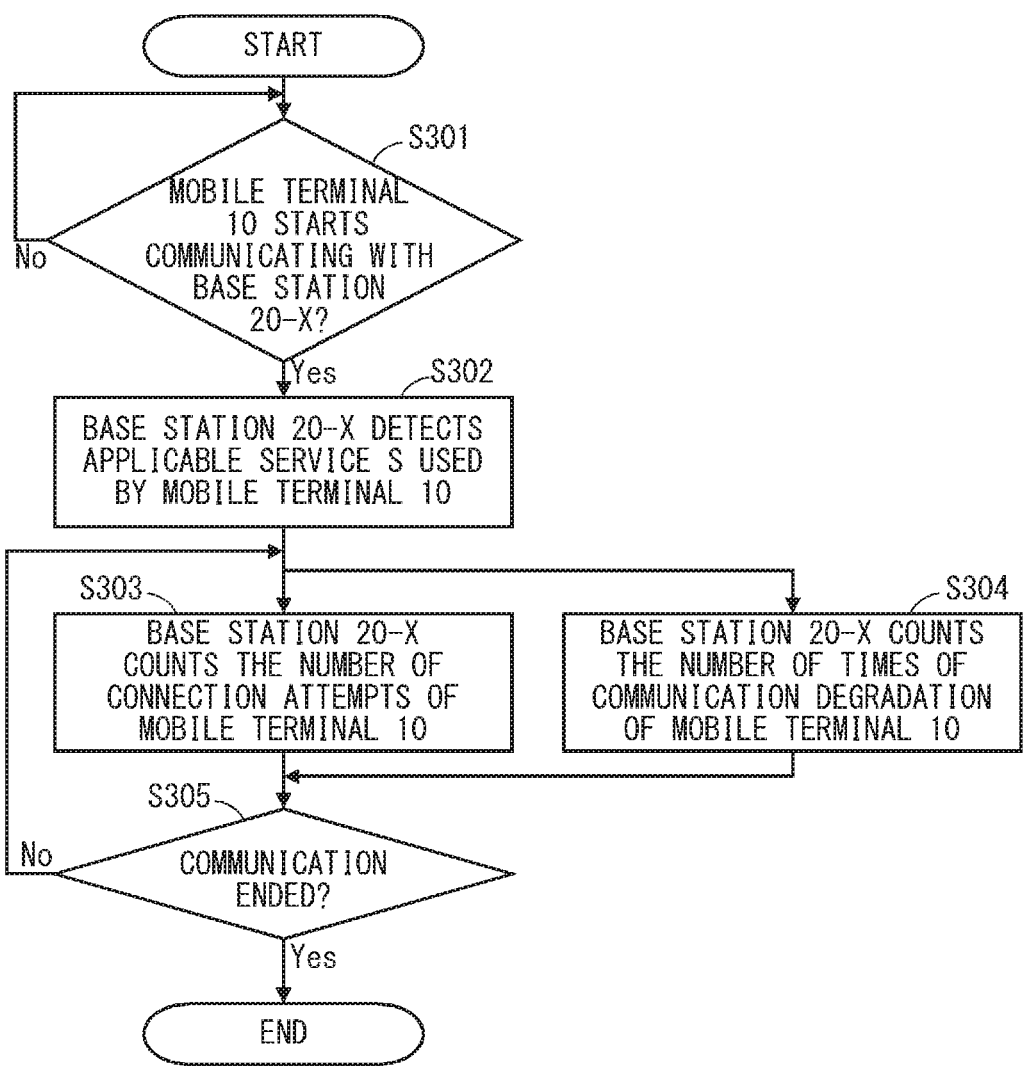
FIG. 7 is a flowchart showing an operation example when the base station counts the number of connection attempts and the number of times of communication degradation in the communication system according to the first embodiment.

Next, an operation when the base station 20 counts the number of connection attempts and the number of times of the communication degradation will be described with reference to FIG. 7. FIG. 7 is a flowchart showing an operation example when the base station 20 counts the number of connection attempts and the number of times of the communication degradation in the communication system according to the first embodiment. FIG. 7 shows an operation example when the base station 20-X counts.

As shown in FIG. 7, in the base station 20-X, when the mobile terminal 10 camping on the cell of the base station 20-X is connected to the base station 20-X and starts communication (Step S301:Yes), the service content detection unit 24 detects the applicable service used by the mobile terminal 10 (Step S302). Here, suppose that the applicable service used by the mobile terminal 10 is the applicable service S that is a VoLTE service.

After that, in the base station 20-X, the connection attempt counter 291 increments the connection attempt count data C (C=C+1) indicating the number of connection attempts for the applicable service S stored in the count data storage unit 293 each time the mobile terminal 10 attempts to connect to the base station 20-X, and the count data storage unit 293 stores the incremented connection attempt counter data C (Step S303).

Further, the communication degradation counter 292 increments the communication degradation counter data R (R=R+1) indicating the number of times of the communication degradation for the applicable service S stored in the counter data storage unit 293 each time the communication quality of the mobile terminal 10 degrades, and the counter data storage unit 293 stores the incremented communication degradation counter data R (Step S304).

The above-described processes in Steps S303 and S304 are repeated until the communication between the mobile terminal 10 and the base station 20-X is ended (Yes in Step S305).

Each time the base station 20-X starts communication with the mobile terminal 10, the operation of FIG. 7 is performed.

The other base stations 20-Y1, 20-Y2 and 20-Y3 perform the operation of FIG. 7 each time they start communication with the mobile terminal 10 in a manner similar to the base station 20-X.

Steps S101 and S105 in FIG. 5 are the same processes as Steps S301 and S302 in FIG. 7, respectively. Thus, Steps S301 and S302 in FIG. 7 may be omitted, and the processes in Steps S303 to S305 in FIG. 7 may be performed after the process in Step S105 in FIG. 5.

Figure 8:
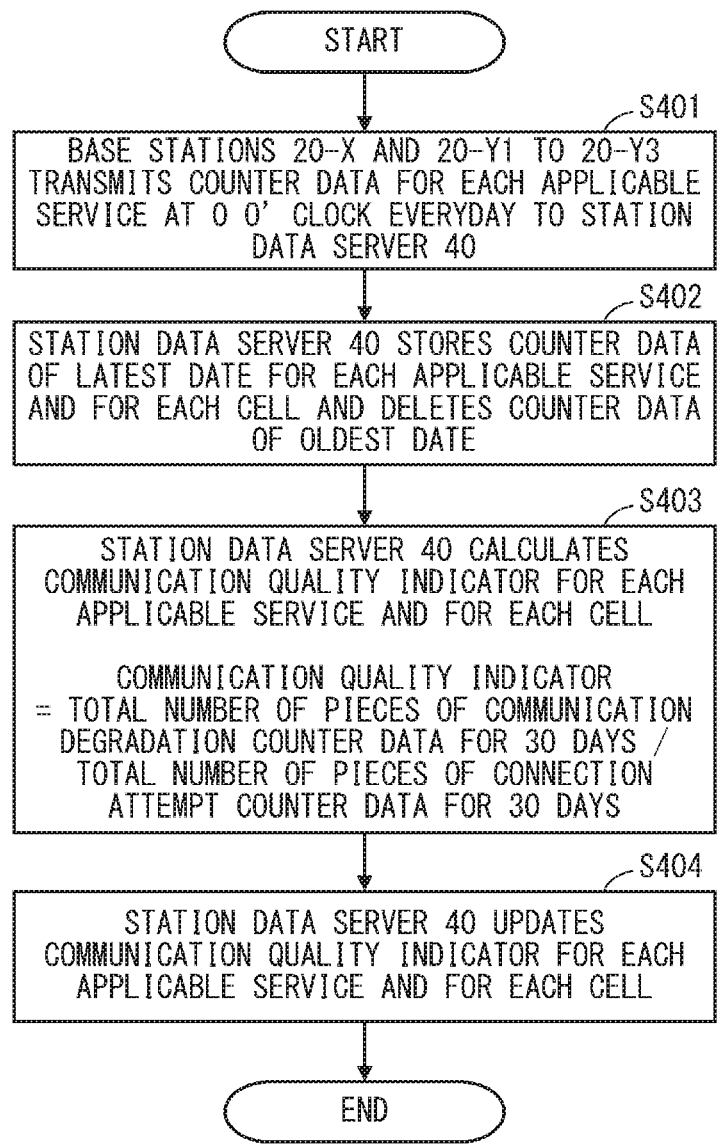
FIG. 8 is a flowchart showing an operation example when the station data server updates the communication quality indicator in the communication system according to the first embodiment.

Next, an operation when the station data server 40 updates the communication quality indicator will be described with reference to FIG. 8. FIG. 8 is a flowchart showing an operation example when the station data server 40 updates the communication quality indicator in the communication system according to the first embodiment.

As shown in FIG. 8, in each of the base stations 20-X, 20-Y1, 20-Y2, and 20-Y3, the data transmission unit 21 transmits, to the station data server 40, the connection attempt counter data C and the communication degradation counter data R for each applicable service stored in the counter data storage unit 293 at 0 o'clock everyday (Step S401). After the transmission to the station data server 40, the connection attempt counter data C of the connection attempt counter 291 and the communication degradation counter data R of the communication degradation counter 292 are reset.

In the station data server 40, the data reception unit 42 receives the connection attempt counter data C and the communication degradation number data R for each applicable service from each of the base stations 20-X, 20-Y1, 20-Y2 and 20-Y3. After that, the counter data updating unit 45 stores the connection attempt counter data C and the communication degradation counter data R received from each of the base stations 20-X, 20-Y1, 20-Y2, and 20-Y3 for each applicable service and for each cell in the counter data storage unit 432. Here, the counter data storage unit 432 stores the connection attempt counter data C and the communication degradation number data R for 30 days for each applicable service and for each cell. For this reason, the counter data updating unit 45 deletes the counter data of the oldest date when the counter data of the latest date is stored (Step S402). For example, when the counter data of April 27 is newly stored, the counter data of March 28, which is 30 days ago and is the oldest date, is deleted.

Next, in the station data server 40, the communication quality indicator calculation unit 44 calculates the communication quality indicator for each applicable service and for each cell (Step S403).

For example, suppose that when the communication quality indicator of the cell X for the applicable service S is $S_X$, the communication quality indicator $S_X$ is calculated as follows.

> Communication quality indicator $S_X$=the total number of pieces of the communication degradation counter data $R$ for 30 days in the cell $X$ for the applicable service $S$/the total number of pieces of the connection attempt counter data $C$ for 30 days in the cell $X$ for the applicable service $S$ After the communication quality indicator calculation unit 44 calculates the communication quality indicator for each applicable service and for each cell, it stores the calculated communication quality indicator for each applicable service and for each cell in the data storage unit 43 and updates the communication quality indicators (Step S404).

FIG. 9 is a diagram showing an example of data of the communication quality indicator of each cell for a certain applicable service stored in the data storage unit 43 of the station data server 40 in the communication system according to the first embodiment.

For the applicable service shown in FIG. 9, the communication quality indicator of the cell X is the smallest. Thus, the base station 20-X continues the current communication between the mobile terminal 10 and the base station 20-X for the mobile terminal 10 camping on the cell X.

As described above, according to the first embodiment, the station data server 40 stores the communication quality indicator for each applicable service and for each cell. The base station 20 acquires, from the station data server 40, the communication quality indicators of the host cell and the adjacent cells for the applicable service used by the mobile terminal 10 camping on the host cell, and determines whether the host cell is an optimum cell for the applicable service among the host cell and the adjacent cells based on the acquired communication quality indicators. When the host cell is not the optimum cell, the base station 20 makes the mobile terminal 10 transition to the adjacent cell which is the optimum cell.

By doing so, the mobile terminal 10 can be transitioned to the optimum cell according to the applicable service used by the mobile terminal 10. This also enables cell transition according to the user's sensible quality for each applicable service, thereby improving the user's sensible quality.

(2) Second Embodiment

In the above-described first embodiment, it is determined whether the cell on which the mobile terminal 10 camps is the optimum cell using the communication quality indicator of the cell regarding the applicable service used by the mobile terminal 10.

However, the communication quality indicator is not necessarily the same within the same cell and instead it is considered that the communication quality indicator may differ depending on the position within the cell.

Thus, in the second embodiment, the position of the mobile terminal 10 in the cell on which the mobile terminal 10 camps is classified based on the SINR. Then, it is determined whether the cell is the optimum cell using the communication quality indicator at a position where the mobile terminal 10 camps (the position identified by the SINR) in the cell on which the mobile terminal 10 camps regarding the applicable service used by the mobile terminal 10.

The configuration according to the second embodiment is the same as that according to the above-described first embodiment, but an operation according to the second embodiment differs from that according to the first embodiment. Hence, an operation according to the second embodiment different from that according to the above-described first embodiment will be mainly described.

First, the difference between the second embodiment and the above-described first embodiment in the flow of FIG. 5 (the flow in which the base station 20 controls cell transition according to the applicable service used by the mobile terminal 10) will be described.

Step S103:

In the mobile terminal 10, after the data reception unit 12 receives the request for the RF information from the base station 20-X, the RF information acquisition unit 13 acquires the RF information about the camping cell (i.e., the cell of the base station 20-X) and the adjacent cells (i.e., the cells of the base stations 20-Y1, 20-Y2, and 20-Y3). At this time, the data reception unit 12 acquires, as the RF information, an SINR of the position where the mobile terminal 10 camps in the camping cell in addition to the cell numbers of the camping cell and the adjacent cells.

Step S106:

In the base station 20-X, after the service content detection unit 24 detects the applicable service S, the data request unit 25 requests the station data server 40 for the communication quality indicator of the SINR at the camping position in the camping cell X for the applicable service S and the communication quality indicators of the adjacent cells Y1, Y2, Y3 for the applicable service S. At this time, for example, the communication quality indicator of the position having the same SINR in the adjacent cell Y1 as that in the cell X is requested as the communication quality indicator of the adjacent cell Y1. However, the present disclosure is not limited to this and instead the communication quality indicator of the entire adjacent cell Y1 (i.e., the communication quality indicator like the one in the first embodiment) may be requested as the communication quality indicator of the adjacent cell Y1. The request for the communication quality indicator is transmitted from the data transmission unit 21 of the base station 20-X.

Step S107:

In the station data server 40, after the data reception unit 42 receives the request for the communication quality indicator from the base station 20-X, the data transmission unit 41 acquires the communication quality indicator of the SINR of the camping cell X for the applicable service S and the communication quality indicators of the adjacent cells Y1, Y2, and Y3 for the applicable service S, which are stored in the communication quality indicator storage unit 431.

The flow of FIG. 6 (the flow in which the threshold of the communication quality indicator for each applicable service is input to the base station 20) according to the second embodiment is the same as that according to the above-described first embodiment.

Next, the difference between the second embodiment and the above-described first embodiment in the flow of FIG. 7 (the flow in which the base station 20 counts the number of connection attempts and the number of times of the communication degradation) will be described.

Step S303:

In the base station 20-X, the connection attempt counter 291 increments the connection attempt count data C (C=C+

1) indicating the number of connection attempts for the applicable service S and for the SINR stored in the count data storage unit 293 each time the mobile terminal 10 attempts to connect to the base station 20-X, and the count data storage unit 293 stores the incremented connection attempt counter data C.

Step S304:

In the base station 20-X, the communication degradation counter 292 increments the communication degradation counter data R (R=R+1) for the applicable service S and for the SINR stored in the counter data storage unit 293 each time the communication quality of the mobile terminal 10 degrades, and the counter data storage unit 293 stores the incremented communication degradation counter data R.

Next, differences between the second embodiment and the above-described first embodiment in the flow of FIG. 8 (the flow in which the station data server 40 updates the communication quality indicator) will be described.

Step S403:

In the station data server 40, the communication quality indicator calculation unit 44 calculates the communication quality indicator for each applicable service, for each cell, and for each SINR.

Step S404:

In the station data server 40, after the communication quality indicator calculation unit 44 calculates the communication quality indicator for each applicable service, for each cell, and for each SINR, it stores the calculated communication quality indicator for each applicable service, for each cell, and for each SINR in the data storage unit 43 to update the communication quality indicator.

FIG. 10 is a diagram showing an example of the communication quality indicator data of each cell for a certain applicable service and for each SINR, which is stored in the data storage unit 43 of the station data server 40 in the communication system according to the second embodiment.

For the applicable service shown in FIG. 10, the communication quality indicator of the cell Y1 is the smallest when the SINR is in the range between −5 and −4. Thus, as for the mobile terminal 10 camping at the position where the SINR in the cell X is in the range between −5 and −4, when the communication quality indicator at that position does not exceed the threshold, the base station 20-X continues the current communication between the base station 20-X and the mobile terminal 10, while when the communication quality indicator at that position exceeds the threshold, the base station 20-X makes the mobile terminal 10 transition to the cell Y1.

Further, as for the applicable service shown in FIG. 10, when the SINR is in the range between 0 and 1, the communication quality indicator of the cell X is the smallest. Thus, the base station 20-X continues the current communication between the mobile terminal 10 and the base station 20-X for the mobile terminal 10 camping at the position where the SINR in the cell X is in the range between 0 and 1.

As described above, according to the second embodiment, the station data server 40 stores the communication quality indicator for each applicable service, for each cell, and for each SINR. The base station 20 acquires, from the station data server 40, the communication quality indicator of the SINR at the position where the mobile terminal 10 camps in the host cell for the applicable service used by the mobile terminal 10 camping on the host cell, and the communication quality indicators of the adjacent cell for the applicable service, determines whether the host cell is the optimum cell for the applicable service among the host cell and the adjacent cells based on the acquired communication quality indicators, and when the host cell is not the optimum cell, the base station 20 makes the mobile terminal 10 transition to the adjacent cell which is the optimum cell.

As described above, since it is determined whether the cell is the optimum cell using the communication quality indicator of the SINR at the position where the mobile terminal 10 camps in the cell on which the mobile terminal 10 camps, the determination accuracy can be improved as compared with that in the above-described first embodiment.

Effects other than the one described above are the same as those of the first embodiment.

(3) Concept of the Embodiments

Next, configurations of a base station 200 and a station data server 400 conceptually showing the base station 20 and the station data server 40 according to the above embodiments will be described.

Figure 11:
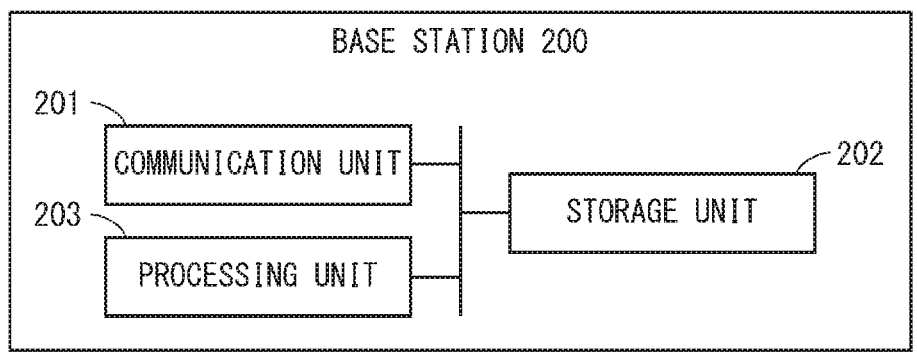
FIG. 11 is a block diagram showing a configuration example of a base station conceptually showing a base station according to the embodiments.

First, the base station 200 will be described. FIG. 11 is a block diagram showing a configuration example of a base station 200 conceptually showing the base station 20 according to the above embodiments.

As shown in FIG. 11, the base station 200 includes a communication unit 201, a storage unit 202, and a processing unit 203.

The communication unit 201 corresponds to the data transmission unit 21 and the data reception unit 22. The communication unit 201 is, for example, a transceiver or the like. For example, the communication unit 201 acquires, from the station data server 400, the communication quality indicator of the host cell for the applicable service used by the mobile terminal 10 camping on the host cell and the communication quality indicators of the adjacent cells for the applicable service.

The storage unit 202 corresponds to the threshold storage unit 27 and the counter data storage unit 293. The storage unit 202 is, for example, a combination of a volatile memory and a non-volatile memory.

The processing unit 203 corresponds to the terminal control unit 23, the service content detection unit 24, the data request unit 25, the threshold input unit 26, the cell determination unit 28, the connection attempt counter 291, and the communication degradation counter 292. The processing unit 203 is, for example, a processor such as a microprocessor, a Micro Processing Unit (MPU), or a Central Processing Unit (CPU). For example, the processing unit 203 determines whether the host cell is the optimum cell for the applicable service among the host cell and the adjacent cells based on the communication quality indicator acquired by the communication unit 201. When the host cell is not the optimum cell, the processing unit 203 makes the mobile terminal 10 transition to the adjacent cell which is the optimum cell.

Figure 12:
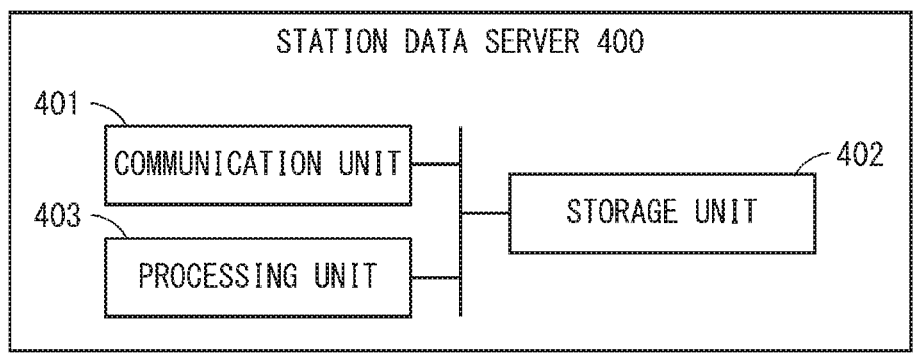
FIG. 12 is a block diagram showing a configuration example of a station data server conceptually showing the station data server according to the embodiments.

Next, the station data server 400 will be described. FIG. 12 is a block diagram showing a configuration example of the station data server 400 conceptually showing the station data server 40 according to the above embodiments.

As shown in FIG. 12, the station data server 400 includes a communication unit 401, a storage unit 402, and a processing unit 403.

The storage unit 402 corresponds to the data storage unit 43. The storage unit 402 is, for example, a combination of a volatile memory and a non-volatile memory. For example, the storage unit 402 stores the communication quality indicator for each applicable service and for each cell.

The communication unit 401 corresponds to the data transmission unit 41 and the data reception unit 42. The communication unit 401 is, for example, a transceiver. For example, the communication unit 401 transmits, to the base station 200, the communication quality indicator of the cell and the adjacent cells for the applicable service used by the mobile terminal 10 camping on the cell of the base station 200.

The processing unit 403 corresponds to the communication quality indicator calculation unit 44 and the counter data updating unit 45. The processing unit 403 is, for example, a processor such as a microprocessor, an MPU, or a CPU. For example, the processing unit 403 calculates the communication quality indicator for each applicable service and for each cell.

Although the present disclosure has been described above with reference to the embodiments, the present disclosure is not limited to the above embodiments. Various modifications that can be understood by those skilled in the art within the scope of the present disclosure can be made to the configurations and details of the present disclosure.

For example, in the above embodiments, the VoLTE service is used as an example of the applicable service. Hence, the communication quality indicator of the cell for the VoLTE service is calculated using the number of connection attempts, which is the number of times the mobile terminal camping on the cell of the base station and is using the VoLTE service attempts to connect to this base station.

However, the applicable service is not limited to the VoLTE service, and may be, for example, an FTP service. In the case of the FTP service, when a large amount of data can be transmitted instantaneously, it is considered that the user's sensible quality can be improved. Therefore, in the case of the FTP service, the communication quality indicator of the cell of the base station for the FTP service may be calculated using an average throughput of the mobile terminal camping on the cell of the base station and using the FTP service.

Although the above embodiments described the mobile terminal, the base station, and the station data server according to the present disclosure as a part of hardware, the present disclosure is not limited to this. The present disclosure can also achieve any processing of the mobile terminal, the base station, and the station data server by a processor reading and executing a computer program stored in a memory.

In the above example, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Compact Disc-Read Only Memory), CD-R (CD-Recordable), CD-R/W (CD-ReWritable), and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The whole or part of the embodiments disclosed above can be described as, but not limited to, the following supplementary notes.

(Supplementary Note 1)

A communication system comprising:
a mobile terminal;
a server configured to store a communication quality indicator for each applicable service and for each cell; and
a base station configured to acquire, from the server, the communication quality indicator of a host cell that is the cell of the base station for an applicable service used by the mobile terminal camping on the host cell and the communication quality indicator of an adjacent cell adjacent to the host cell for the applicable service, determine whether the host cell is an optimum cell for the applicable service among the host cell and the adjacent cell based on the acquired communication quality indicators, and when the host cell is not the optimum cell, make the mobile terminal transition to the adjacent cell which is the optimum cell.

(Supplementary Note 2)

The communication system according to Supplementary note 1, wherein
when the communication quality indicator of the host cell for the applicable service used by the mobile terminal camping on the host cell does not exceed a threshold, the base station determines that the host cell is the optimum cell,
when the communication quality indicator of the host cell for the applicable service exceeds the threshold and the communication quality indicator of the host cell is the smallest among the communication quality indicator of the host cell for the applicable service and the communication quality indicator of the adjacent cell, the base station determines that the host cell is the optimum cell, and
when the communication quality indicator of the host cell for the applicable service exceeds the threshold, and the communication quality indicator of the adjacent cell is the smallest among the communication quality indicator of the host cell for the applicable service and the communication quality indicator of the adjacent cell, the base station determines that the adjacent cell is the optimum cell.

(Supplementary Note 3)

The communication system according to Supplementary note 1, wherein
the server stores the communication quality indicator for each applicable service, for each cell, and for each SINR (Signal to Interference Ratio), and
the base station acquires, from the server, the communication quality indicator of the SINR at a position where the mobile terminal camps in the host cell for the applicable service used by the mobile terminal and the communication quality indicator of the adjacent cell for the applicable service, determines whether the host cell is the optimum cell for the applicable service among the host cell and the adjacent cell based on the acquired communication quality indicators, and when the host cell is not the optimum cell, makes the mobile terminal transition to the adjacent cell which is the optimum cell.

(Supplementary Note 4)

The communication system according to Supplementary note 3, wherein
when the communication quality indicator of the SINR of the host cell for the applicable service used by the mobile terminal camping on the host cell does not exceed a threshold, the base station determines that the host cell is the optimum cell,
when the communication quality indicator of the SINR of the host cell for the applicable service exceeds the threshold, and the communication quality indicator of the host cell is the smallest among the communication quality indicator of the SINR of the host cell for the applicable service and the communication quality indicator of the SINR of the adjacent cell, the base station determines that the host cell is the optimum cell, and when the communication quality indicator of the SINR of the host cell for the applicable service exceeds the threshold, and the communication quality indicator of the SINR of the adjacent cell is the smallest among the communication quality indicator of the SINR of the host cell for the applicable service and the communication quality indicator of the adjacent cell, the base station determines that the adjacent cell is the optimum cell.

(Supplementary Note 5)

The communication system according to any one of Supplementary notes 1 to 4, wherein when the applicable service is a VoLTE (Voice over Long Term Evolution) service, the server calculates the communication quality indicator of the cell of the base station for the VoLTE service using the number of connection attempts, which is the number of times the mobile terminal, camping on the cell of the base station and using the VoLTE service, has attempted to connect to the base station.

(Supplementary Note 6)

The communication system according to any one of Supplementary notes 1 to 4, wherein when the applicable service is an FTP (File Transfer Protocol) service, the server calculates the communication quality indicator of the cell of the base station for the FTP service using an average throughput of the mobile terminal camping on the cell of the base station and using the FTP service.

(Supplementary Note 7)

A base station comprising:

a communication unit configured to acquire, from the server, a communication quality indicator of a host cell that is the cell of the base station for an applicable service used by a mobile terminal camping on the host cell and the communication quality indicator of an adjacent cell adjacent to the host cell for the applicable service; and a processing unit configured to determine whether the host cell is an optimum cell for the applicable service among the host cell and the adjacent cell based on the communication quality indicators acquired by the communication unit, and when the host cell is not the optimum cell, make the mobile terminal transition to the optimum cell.

(Supplementary Note 8)

The base station according to Supplementary note 7, wherein when the communication quality indicator of the host cell for the applicable service used by the mobile terminal camping on the host cell does not exceed a threshold, the processing unit determines that the host cell is the optimum cell, when the communication quality indicator of the host cell for the applicable service exceeds the threshold and the communication quality indicator of the host cell is the smallest among the communication quality indicator of the host cell for the applicable service and the communication quality indicator of the adjacent cell, the base station determines that the host cell is the optimum cell, and when the communication quality indicator of the host cell for the applicable service exceeds the threshold, and the communication quality indicator of the adjacent cell is the smallest among the communication quality indicator of the host cell for the applicable service and the communication quality indicator of the adjacent cell, the base station determines that the adjacent cell is the optimum cell.

(Supplementary Note 9)

The base station according to Supplementary note 7, wherein the communication unit acquires, from the server, the communication quality indicator of an SINR (Signal to Interference Ratio) at a position where the mobile terminal camps in the host cell for the applicable service used by the mobile terminal camping on the host cell and the communication quality indicator of the adjacent cell for the applicable service, and the communication unit determines whether the host cell is the optimum cell for the applicable service among the host cell and the adjacent cell based on the communication quality indicators acquired by the communication unit, and when the host cell is not the optimum cell, the processing unit makes the mobile terminal transition to the adjacent cell which is the optimum cell.

(Supplementary note 10)

The base station according to Supplementary note 9, wherein when the communication quality indicator of the SINR of the host cell for the applicable service used by the mobile terminal camping on the host cell does not exceed a threshold, the processing unit determines that the host cell is the optimum cell, when the communication quality indicator of the SINR of the host cell for the applicable service exceeds the threshold, and the communication quality indicator of the host cell is the smallest among the communication quality indicator of the SINR of the host cell for the applicable service and the communication quality indicator of the SINR of the adjacent cell, the base station determines that the host cell is the optimum cell, and when the communication quality indicator of the SINR of the host cell for the applicable service exceeds the threshold, and the communication quality indicator of the SINR of the adjacent cell is the smallest among the communication quality indicator of the SINR of the host cell for the applicable service and the communication quality indicator of the adjacent cell, the base station determines that the adjacent cell is the optimum cell.

(Supplementary Note 11)

A server comprising:

a storage unit configured to store a communication quality indicator for each applicable service and for each cell; and a communication unit configured to transmit, to a base station, the communication quality indicator of a cell for an applicable service used by a mobile terminal camping on the cell of the base station and the communication quality indicator of an adjacent cell adjacent to the cell for the applicable service.

(Supplementary Note 12)

The supplementary note according to Supplementary note 11, wherein the storage unit stores the communication quality indicator for each applicable service, for each cell, and for each SINR (Signal to Interference Ratio), and the communication unit transmits, to the base station, the communication quality indicator of the SINR at a position where the mobile terminal camps in the cell for the applicable service used by the mobile terminal camping on the cell of the base station and the communication quality indicator of the adjacent cell for the applicable service.

(Supplementary Note 13)

The server according to Supplementary note 11 or 12, further comprising a processing unit configured to calculate, when the applicable service is a VoLTE (Voice over Long Term Evolution) service, the communication quality indicator of the cell of the base station for the VoLTE service using the number of connection attempts, which is the number of times the mobile terminal, camping on the cell of the base station and using the VoLTE service, has attempted to connect to the base station.

(Supplementary Note 14)

The communication system according to Supplementary note 11 or 12, further comprising a processing unit configured to calculate, when the applicable service is an FTP (File Transfer Protocol) service, the communication quality indicator of the cell of the base station for the FTP service using an average throughput of the mobile terminal camping on the cell of the base station and using the FTP service.

(Supplementary Note 15)

A method for controlling a base station comprising:

acquiring, from a server, a communication quality indicator of a host cell that is the cell of the base station for an applicable service used by a mobile terminal camping on the host cell and the communication quality indicator of an adjacent cell adjacent to the host cell for the applicable service; and determining whether the host cell is an optimum cell for the applicable service among the host cell and the adjacent cell based on the acquired communication quality indicators, and when the host cell is not the optimum cell, making the mobile terminal transition to the adjacent cell which is the optimum cell.

(Supplementary note 16)

A method for controlling a server including;

storing a communication quality indicator for each applicable service and for each cell; and transmitting, to a base station, the communication quality indicator of a cell for an applicable service used by a mobile terminal camping on the cell of the base station and the communication quality indicator of an adjacent cell adjacent to the cell for the applicable service.

(Supplementary Note 17)

A non-transitory computer readable medium storing a program causing a base station to execute:

a step of acquiring, from a server, a communication quality indicator of a host cell that is the cell of the base station for an applicable service used by a mobile terminal camping on the host cell and the communication quality indicator of an adjacent cell adjacent to the host cell for the applicable service; and a step of determining whether the host cell is an optimum cell for the applicable service among the host cell and the adjacent cell based on the communication quality indicators acquired by the communication unit, and when the host cell is not the optimum cell, make the mobile terminal transition to the optimum cell.

(Supplementary note 18)

A non-transitory computer readable medium storing a program causing a server to execute:

a step of storing a communication quality indicator for each applicable service and for each cell; and a step of transmitting, to a base station, the communication quality indicator of a cell for an applicable service used by a mobile terminal camping on the cell of the base station and the communication quality indicator of an adjacent cell adjacent to the cell for the applicable service.

The first and second embodiments can be combined as desirable by one of ordinary skill in the art.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. A communication system comprising:

a mobile terminal;

a server configured to store a communication quality indicator for each combination of a plurality of combinations, each combination including an applicable service of one or more applicable services and a cell of one or more cells; and a base station configured to:

acquire, from the server, the communication quality indicator for the combination of a host cell that is the cell of the base station and the applicable service used by the mobile terminal camping on the host cell and the communication quality indicator for the combination of the cell adjacent to the host cell and the applicable service;

determine whether the host cell or the cell adjacent to the host cell is an optimum cell for the applicable service based on the acquired communication quality indicators; and when the host cell is not the optimum cell, make the mobile terminal transition to the cell adjacent to the host cell, as the optimum cell, wherein each combination further includes an SINR (Signal to Interference Ratio) of a plurality of SINRs, and the base station acquires, from the server, the communication quality indicator for the combination of the host cell, the applicable service, and the SINR at a position where the mobile terminal camps in the host cell for the applicable service, and the communication quality indicator for the combination of the cell adjacent to the host cell, the applicable service, and the SINR at the position.

2. The communication system according to claim 1, wherein when the communication quality indicator for the combination of the host cell and the applicable service does not exceed a threshold, the base station determines that the host cell is the optimum cell, when the communication quality indicator for the combination of the host cell and the applicable service exceeds the threshold and is smaller than the communication quality indicator for the combination of the cell adjacent to the host cell and the applicable service, the base station determines that the host cell is the optimum cell, and when the communication quality indicator for the combination of the host cell and the applicable service exceeds the threshold and is greater than the communication quality indicator for the combination of the cell adjacent to the host cell and the applicable service, the base station determines that the adjacent cell is the optimum cell.

3. The communication system according to claim 1, wherein when the communication quality indicator for the combination of the host cell, the applicable service, and the SINR at the position does not exceed a threshold, the base station determines that the host cell is the optimum cell, when the communication quality indicator for the combination of the host cell, the applicable service, and the SINR at the position exceeds the threshold and is smaller than the communication quality indicator for the combination of the cell adjacent to the host cell, the applicable service, and the SINR at the position, the base station determines that the host cell is the optimum cell, and when the communication quality indicator for the combination of the host cell, the applicable service, and the SINR at the position exceeds the threshold and is greater than the communication quality indicator for the combination of the cell adjacent to the host cell, the applicable service, and the SINR at the position, the base station determines that the adjacent cell is the optimum cell.

4. The communication system according to claim 1, wherein when the applicable service is a VoLTE (Voice over Long Term Evolution) service, the server calculates the communication quality indicator for the combination of the host cell and the VoLTE service using a number of connection attempts, which is a number of times the mobile terminal, camping on the host cell and using the VoLTE service, has attempted to connect to the base station.

5. The communication system according to claim 1, wherein when the applicable service is an FTP (File Transfer Protocol) service, the server calculates the communication quality indicator for the combination of the host cell and the FTP service using an average throughput of the mobile terminal camping on the host cell and using the FTP service.

6. A base station comprising:

a processor;

a memory storing a program executable by the processor to:

acquire, from a server, a communication quality indicator for a combination of a host cell that is the cell of the base station and an applicable service used by a mobile terminal camping on the host cell, and a communication quality indicator for a combination of a cell adjacent to the host cell and the applicable service;

determine whether the host cell or the cell adjacent to the host cell is an optimum cell for the applicable service based on the acquired communication quality indicators; and when the host cell is not the optimum cell, make the mobile terminal transition to the cell adjacent to the host cell, as the optimum cell, wherein each combination further includes an SINR (Signal to Interference Ratio) of a plurality of SINRs, and the base station acquires, from the server, the communication quality indicator for the combination of the host cell, the applicable service, and the SINR at a position where the mobile terminal camps in the host cell for the applicable service, and the communication quality indicator for the combination of the cell adjacent to the host cell, the applicable service, and the SINR at the position.

7. The base station according to claim 6, wherein when the communication quality indicator for the combination of the host cell and the applicable service does not exceed a threshold, the processor determines that the host cell is the optimum cell, when the communication quality indicator for the combination of the host cell and the applicable service exceeds the threshold and is smaller than the communication quality indicator for the combination of the cell adjacent to the host cell and the applicable service, the base station determines that the host cell is the optimum cell, and when the communication quality indicator for the combination of the host cell and the applicable service exceeds the threshold and is larger than the communication quality indicator for the combination of the cell adjacent to the host cell and the applicable service, the base station determines that the adjacent cell is the optimum cell.

8. The base station according to claim 6, wherein when the communication quality indicator for the combination of the host cell, the applicable service, and the SINR at the position does not exceed a threshold, the processor determines that the host cell is the optimum cell, when the communication quality indicator for the combination of the host cell, the applicable service, and the SINR at the position exceeds the threshold and is smaller than the communication quality indicator for the combination of the cell adjacent to the host cell, the applicable service, and the SINR at the position, the processor determines that the host cell is the optimum cell, and when the communication quality indicator for the combination of the host cell, the applicable service, and the SINR at the position exceeds the threshold and is greater than the communication quality indicator for the combination of the cell adjacent to the host cell, the applicable service, and the SINR at the position, the processor determines that the adjacent cell is the optimum cell.

9. A method for controlling a base station comprising:

acquiring, from a server, a communication quality indicator for a combination of a host cell that is the cell of the base station and an applicable service used by a mobile terminal camping on the host cell, and a communication quality indicator for a combination of a cell adjacent to the host cell and the applicable service;

determining whether the host cell or the cell adjacent to the host cell is an optimum cell for the applicable service based on the acquired communication quality indicators; and when the host cell is not the optimum cell, making the mobile terminal transition to the cell adjacent to the host cell, as the optimum cell, wherein each combination further includes an SINR (Signal to Interference Ratio) of a plurality of SINRs, and the base station acquires, from the server, the communication quality indicator for the combination of the host cell, the applicable service, and the SINR at a position where the mobile terminal camps in the host cell for the applicable service, and the communication quality indicator for the combination of the cell adjacent to the host cell, the applicable service, and the SINR at the position.

* * * * *